United States Patent
Johansson et al.

(10) Patent No.: US 6,810,979 B2
(45) Date of Patent: Nov. 2, 2004

(54) PROPULSION ENGINE HOUSING

(75) Inventors: Peter Johansson, Växjö (SE); Roger Melander, Växjö (SE)

(73) Assignee: Volvo Articulated Haulers AB, Växjö (SE)

(*) Notice: Subject to any disclaimer, the term of this patent is extended or adjusted under 35 U.S.C. 154(b) by 0 days.

(21) Appl. No.: 10/065,389

(22) Filed: Oct. 11, 2002

(65) Prior Publication Data

US 2003/0051931 A1 Mar. 20, 2003

Related U.S. Application Data

(63) Continuation of application No. PCT/SE01/00791, filed on Apr. 10, 2001, now abandoned.

(30) Foreign Application Priority Data

Apr. 11, 2000 (SE) ............................................. 0001314

(51) Int. Cl.[7] ................................................. B60R 3/02
(52) U.S. Cl. ................................. 180/69.21; 280/164.1; 296/193.1
(58) Field of Search ...................... 180/69.21; 280/166, 280/164.1, 163; 244/129.6; 114/362; 296/193.1, 193.11; 293/115

(56) References Cited

U.S. PATENT DOCUMENTS

| | | | | |
|---|---|---|---|---|
| 2,196,546 A | * | 4/1940 | Bowers | 244/129.6 |
| 2,453,937 A | * | 11/1948 | Ray | 244/129.6 |
| 2,468,809 A | * | 5/1949 | Brock et al. | 180/69.2 |
| 2,931,599 A | * | 4/1960 | McQuilkin | 244/129.6 |
| 3,610,658 A | * | 10/1971 | Sartori | 280/166 |
| 4,057,125 A | * | 11/1977 | Kroft | 280/166 |
| 4,074,786 A | * | 2/1978 | Joubert | 280/166 |
| 4,086,726 A | * | 5/1978 | Moses | 114/362 |
| 4,319,653 A | * | 3/1982 | Carlson | 180/89.17 |
| 4,556,125 A | * | 12/1985 | Johnson | 280/166 |
| 5,312,150 A | * | 5/1994 | Quam | 296/62 |
| 5,538,265 A | * | 7/1996 | Chen et al. | 280/163 |
| 6,179,312 B1 | * | 1/2001 | Paschke et al. | 280/166 |
| 6,460,915 B1 | * | 10/2002 | Bedi et al. | 296/183 |

FOREIGN PATENT DOCUMENTS

| | | |
|---|---|---|
| DE | 1183388 A | 12/1964 |
| DE | 2705849 A1 | 8/1978 |
| DE | 19608048 A1 | 9/1997 |
| EP | 0382074 A1 | 8/1990 |
| EP | 0885776 A1 | 12/1998 |

* cited by examiner

Primary Examiner—Christopher P. Ellis
Assistant Examiner—Jeffrey Restifo
(74) Attorney, Agent, or Firm—Novak Druce LLP

(57) ABSTRACT

A propulsion engine housing for a motor vehicle having at least one door arranged to allow positioning in one closed and one open position. The inside of the door is provided with steps in order to facilitate access to the engine for the driver/mechanic.

16 Claims, 3 Drawing Sheets

# PROPULSION ENGINE HOUSING

CROSS REFERENCE TO RELATED APPLICATIONS

The present application is a continuation of International Application No. PCT/SE01/00791, filed 10 Apr. 2001 and published in English pursuant to PCT Article 21(2), now abandoned, and which claims priority to Swedish Application No. 0001314-4 filed 11 Apr. 2000. Said applications are hereby incorporated by reference in their entireties.

BACKGROUND OF INVENTION

1. Technical Field

The present invention relates to a propulsion engine housing for a motor vehicle. According to the invention, the engine housing includes at least one door arranged to be position in at least one closed and one open position.

2. State of the Art

On certain types of heavy motor vehicles, such as cross-country construction vehicles, the engine is located relatively high in order to obtain good ground clearance of the vehicle. In order to facilitate access to the engine for the driver/mechanic during service, one or more rungs or steps are usually provided in at the outside of the driver's cab and which lead to a ledge adjacent the engine where a mechanic can stand when servicing the engine. One problem with this solution is that the steps outside the cab can be too high above the ground to allow easy access to the engine for the driver/mechanic. This particular problem is often resolved by providing the vehicle with extra steps below the fixed steps on the outside of the cab in order to facilitate the driver/mechanic reaching the driver's cab/propulsion engine.

One problem occurring in connection with the extra step(s) are that they are normally positioned so far down that there will be a risk, during operation, especially cross-country operation, that they will bump into objects on the ground and be damaged. It occurs, however, that this detrimental aspect of the added step is often solved by providing a detachable ladder on the vehicle that can be placed on the ground for servicing the engine.

This procedure, however, causes certain problems. When such a ladder is not in use, it is fairly cumbersome to keep on the vehicle. Furthermore, special fixtures are required on the vehicle to prevent the ladder from falling off the vehicle during operation and being lost. Finally, the user may experience the ladder as unstable when used on uneven ground.

SUMMARY OF INVENTION

An object of the present invention is to provide an arrangement for facilitating access for the driver/mechanic to the engine of a vehicle. According to at least one embodiment of the invention, a step is provided on the inside of a door comprising a part of the housing within which the vehicle engine is arranged. This door is arranged to allow positioning in a closed position and in an open position in which at least one step can be used. This means that when the door is open, the driver/mechanic may use the step for easier ascent to the engine level at the same time that access to the engine is facilitated since the door is open. This location of the step on the inside of the door further entails that the step is protected from external damage when the door is closed.

According to one preferred embodiment, the door is pivotally attached to the vehicle frame about its lower horizontal long side by means of a hinge arrangement. This results in the step always being easily accessible and being independent, for its stability, of the prevailing ground conditions around the vehicle.

According to a further preferred embodiment, the door constitutes an end section, preferably the front section of the engine housing. This enables ledges to be arranged along the sides of the engine housing, on which a mechanic may stand in connection with servicing the engine.

According to another preferred embodiment, at least one further step is provided on the inside of the door, preferably a folding step requiring only a small space, and in turn allowing the thickness of the door, and thus the space requirement, to be limited.

According to still another preferred embodiment, the door is designed as a self-supporting structure, for example made of metal, on the inside of which steps are provided. One advantage of the door being configured according to this embodiment is that it will be of relatively simple construction and thus simpler and less costly in manufacture.

Further advantages and objects of the invention can be gathered from the appended claims and the following description.

DETAILED DESCRIPTION

Figure 1:
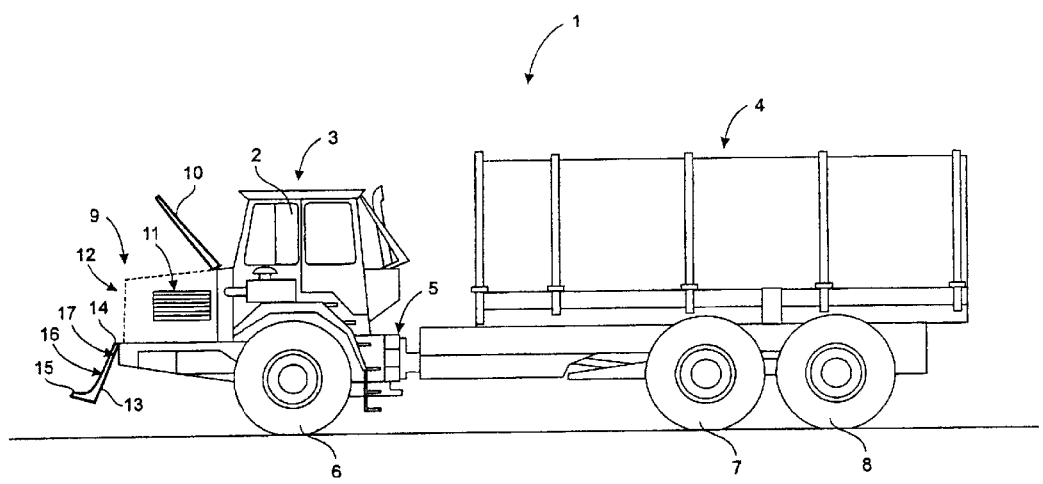
FIG. 1 is a side elevational schematic view of a cross-country construction vehicle of the dumper type, equipped with a preferred embodiment of a propulsion engine housing configured according to the present invention.

FIG. 1 shows a side elevational view of an articulated load-carrying vehicle, a so-called dumper 1, in the known manner having a forward vehicle section 3 supporting the cab 2 and the propulsion engine, and a rear, load-carrying vehicle section 4, connected via a vertical articulation shaft 5 with the forward vehicle section 3.

The forward and rear vehicle sections 3 and 4 are also pivotally connected with each other about a vertical pivot shaft that is not shown, but which allows relative pivotation of the vehicle sections along a longitudinal axis of the vehicle.

For steering of the vehicle 1 in operation, the forward vehicle section 3 is brought to pivot about the vertical articulation shaft 5 with the aid of a pair hydraulic cylinders that are typically provided on each side of the articulation shaft 5. The torque delivered by the engine is transferred to the front wheels 6, and to the rear wheels 7, 8 via a cardan shaft.

The forward vehicle section 3 is further provided with a propulsion engine housing 9, arranged forward of the driver's cab 2, and including an engine casing 10, side walls 11 and a front section 12, formed like a door 13. The door 13 is pivotally attached about its lower, horizontal long side to the forward vehicle section 3 by means of a hinge arrangement 14.

On the inside of the door, steps 15, 16, 17 are provided, and at least one step 16 is of a folding design so that when the door 13 is closed, the step 16 will be substantially in a plane parallel with the door 13. As the steps 15, 16, 17 are arranged on the inside of the door 13, they will be protected from external damage during operation.

Figure 2:
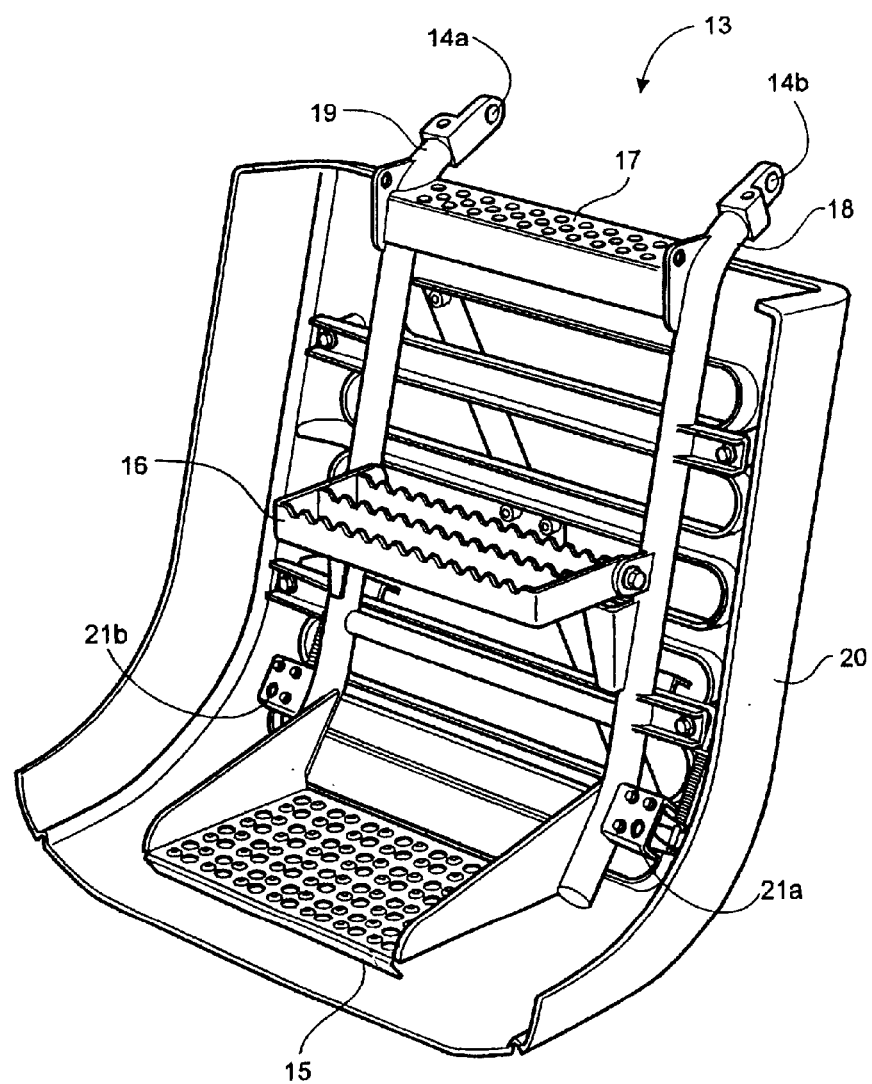
FIG. 2 is a perspective view of a door of the engine housing represented in FIG. 1.

With reference now to FIG. 2, a preferred embodiment of the door 13 configured according to the present invention will be described. In the illustrated example, the door 13 includes a girder structure having two parallel girders 18, 19, between which the steps 15, 16, 17 extend. Because the lower 15 and the upper 17 steps are rigidly connected to the girders 18, 19, a stable frame structure is obtained. This makes the steps 15, 16, 17 stable for the driver/mechanic to step upon.

In the illustrated embodiment of the present invention, the frame structure also constitutes a support for a vehicle front grille 20 adherent to the door 13. By manufacturing the vehicle grille 20 in a plastic and/or a composite material, a strong and light design is obtained.

The girders 18, 19 are pivotally attached, at the lower end of the door, to the forward vehicle section 3 as exemplarily shown in FIG. 1. This attachment to the vehicle is preferably made to the framework by means of the hinge arrangement 14a, 14b. Because of this arrangement, the steps 15,16,17 remain stable independently of the ground upon which the vehicle is standing. At the top end of the door, girders 18, 19 are provided with locking devices 21a, 21b that interact with locking studs provided on the forward vehicle section 3 in order to secure the door 13 in a closed position during driving.

The step 16 is pivotally attached by a hinge arrangement to the girders 18, 19 thereby allowing it to pivot in the upwards/inwards direction so as to be, in its folded-in position, substantially in a plane parallel with the girders 18, 19 and the door 13. Due to this arrangement, the door 13, with its adherent steps 15, 16, 17 will require relatively little space.

Figure 3:
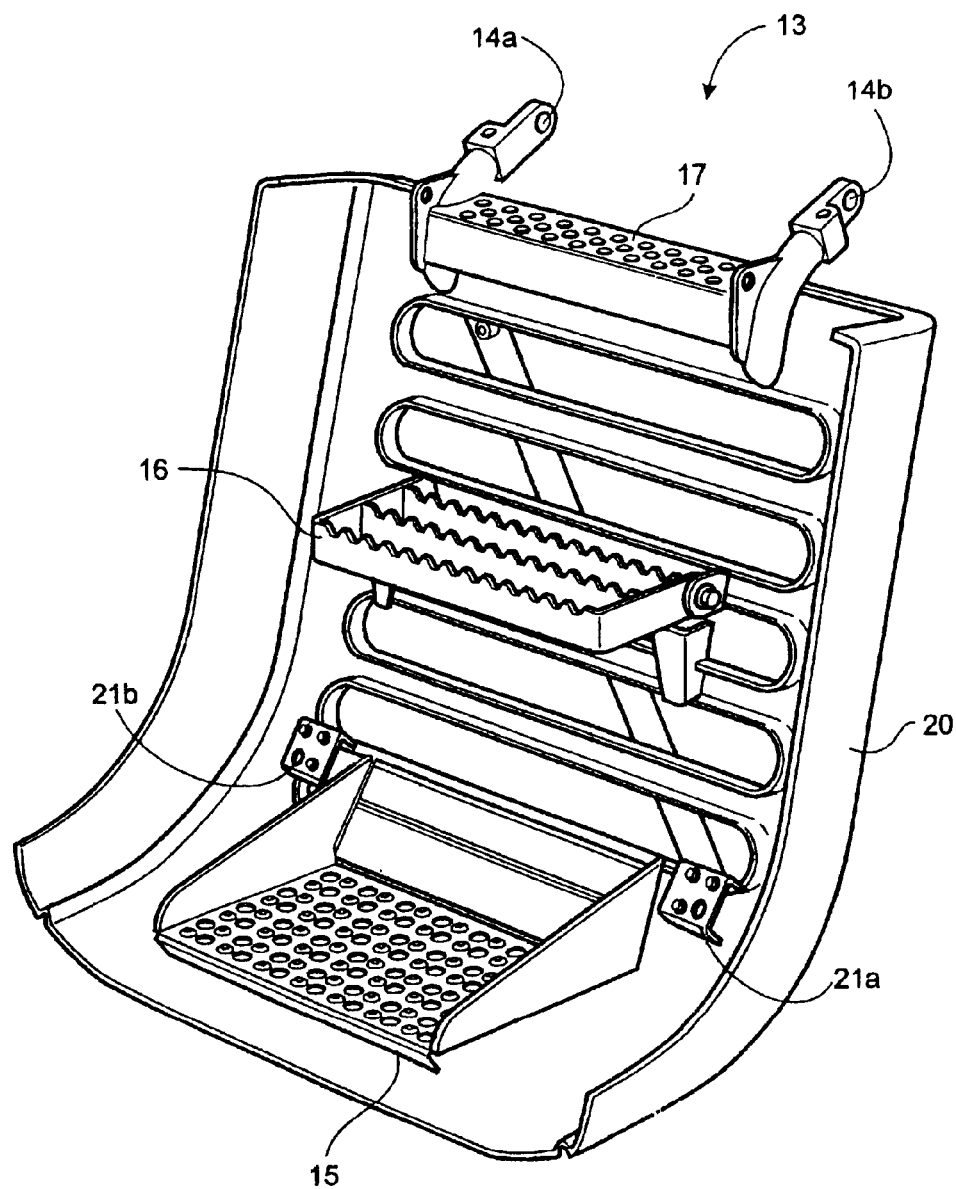
FIG. 3 is a perspective view of an alternative embodiment of a door to an engine housing as represented in FIG. 1.

FIG. 3 shows a perspective view of a preferred, but alternative embodiment of the door 13 to that shown in FIG. 2. Rather than having the girder structure supporting the vehicle grille 20 as was described above, the vehicle grille 20 is designed as a self-supporting structure that is, for example, made of metal and located on the inside of the structure upon which steps 15, 16, 17 are provided. Again, the door 13 is pivotally attached to the forward vehicle section 3 of the vehicle as demonstrated in FIG. 1. Preferably this attachment is to the vehicle framework, by means of the hinge arrangement 14a, 14b, and is provided with locking devices 21a, 21b that interact with locking studs provided on the forward vehicle section 3 in order to secure the door 13 in a closed position during driving.

It should be appreciated that the intent is not that the invention will be limited to what has been described above, but instead that other embodiments also fit within the scope of the invention that has been claimed hereinbelow. For example, the steps may be configured as horizontal recesses/apertures in the door so that the recesses/apertures function as air inlets to the engine housing. Further, on motor vehicles having the engine behind the driver's cab, the door may be arranged at the rear end portion of the vehicle. In the embodiment described above, only one step is foldingly arranged on the inside of the door, but it should be obvious to the person skilled in the art that also further steps might be foldingly arranged on the inside of the door. Furthermore, he door could also be equipped with a fold-down/pull-down type ladder, allowing the lowest step to be located below the lower edge of the door.

What is claimed is:

1. A propulsion engine housing for a land motor vehicle, said engine housing comprising:
   at least one door arranged to allow positioning in one closed and one open position, wherein the inside of said door is provided with at least one lower and one upper step and wherein said door provides engine access when in the open position; and
   said door is pivotally coupled to said vehicle by means of a hinge arrangement and wherein said upper step is positioned above said hinge arrangement when said door is in the closed position and wherein said upper step is positioned below said hinge arrangement when said door is in the open position.

2. A propulsion engine housing for a land motor vehicle, said engine housing comprising:
   at least one door arranged to allow positioning in one closed and one open position, wherein the inside of said door is provided with at least one lower and one upper step and wherein said door provides engine access when in the open position; and
   said door is pivotally coupled to said vehicle by means of a hinge arrangement and wherein said upper step is positioned above said hinge arrangement when said door is in the closed position and wherein said upper step is positioned below said hinge arrangement when said door is in the open position.

3. A propulsion engine housing for a land motor vehicle, said engine housing comprising:
   an engine access door transitionable between open and closed portions, said door providing access to an engine of the vehicle when in the open position;
   an inside of said door being provided with an upper and a lower step; and
   said door being pivotally coupled to said vehicle by a hinge arrangement when said door is in the closed postion and wherein said upper step is positioned below said hinge arrangement when said door is in the open position.

4. A propulsion engine housing for a land motor vehicle, said engine housing comprising:
   an engine access door transitionable between open and closed portions, said door providing access to an engine of the vehicle when in the open position;
   an inside of said door being provided with an upper and a lower step; and
   said door being pivotally coupled to said vehicle by a hinge arrangement when said door is in the closed postion and wherein said upper step is positioned below said hinge arrangement when said door is in the open position.

5. The propulsion engine as recited in any one of claims 1–4, wherein said door has a lower horizontal long side and wherein said door is arranged to pivot about said loweer horizontal long side.

6. The propulsion engine as recited in any one of claims 1–4, wherein said door constitutes an end portion of said engine housing.

7. The propulsion engine as recited in any one of claims 1–4, wherein said lower and upper steps are rigidly attached to at least two parallel girders spaced from each other.

8. The propulsion engine housing as recited in claim 7, wherein said girders are pivotally attached by said hinge arrangement to the motor vehicle.

9. The propulsion engine as recited in any one of claims 1–4, wherein said door further comprises at least one additional step.

10. The propulsion engine as recited in claim 9, wherein said at least one additional step is foldingly arranaged on the inside of the door.

11. The propulsion engine as recited in any one of claims 1–4, wherein said door is a self-supporting structure upon which the steps are provided.

12. The propulsion engine as recited in any one of claims 1–4, wherein said door is substantially vertically oriented when in the closed position.

13. The propulsion engine as recited in any one of claims 1–4, wherein said land motor vehicle is a truck.

14. The propulsion engine as recited in any one of claims 1–4, wherein said door has a range of pivoting motion greater than ninety degrees.

15. The propulsion engine as recited in any one of claims 1–4, wherein said door constitutes a front end portion, of said engine housing.

16. The propulsion engine as recited in any one of claims 1–4, wherein said door is designed as a self-supporting structure constructed of metal and on the inside of which the steps are provided.

* * * * *